United States Patent [19]

Fuerst et al.

[11] Patent Number: 4,749,225
[45] Date of Patent: Jun. 7, 1988

[54] VEHICLE ROOF

[75] Inventors: Arpad Fuerst, Munich; Alfons Lutz, Emmering, both of Fed. Rep. of Germany

[73] Assignee: Webasto-Werk W. Baier GmbH & Co., Gauting, Fed. Rep. of Germany

[21] Appl. No.: 939,139

[22] Filed: Dec. 8, 1986

[30] Foreign Application Priority Data

Dec. 23, 1985 [DE] Fed. Rep. of Germany ....... 3545870

[51] Int. Cl.4 .................... B60J 7/047; B60J 7/195
[52] U.S. Cl. .................... 296/216; 296/210; 296/220
[58] Field of Search ............... 296/210, 213, 216, 218, 296/222, 220; 49/498

[56] References Cited

U.S. PATENT DOCUMENTS

| | | | |
|---|---|---|---|
| 2,338,225 | 1/1944 | Ball | 296/222 |
| 3,378,958 | 4/1968 | Parks et al. | 49/498 X |
| 3,711,147 | 1/1973 | Higuchi et al. | 296/213 X |
| 3,833,254 | 9/1974 | Renner | 296/210 |
| 3,883,993 | 5/1975 | Pullan | 49/498 X |
| 4,220,368 | 9/1980 | Ferrigan | 296/222 X |
| 4,342,481 | 8/1982 | Kanov et al. | 296/218 X |
| 4,417,762 | 11/1983 | Imai et al. | 296/213 X |
| 4,475,767 | 10/1984 | Grimm et al. | 296/221 |

FOREIGN PATENT DOCUMENTS

| | | | |
|---|---|---|---|
| 639478 | 11/1936 | Fed. Rep. of Germany | 296/222 |
| 1162703 | 2/1964 | Fed. Rep. of Germany | 296/222 |
| 2053086 | 6/1979 | Fed. Rep. of Germany | 296/216 |
| 2916682 | 10/1980 | Fed. Rep. of Germany | . |
| 3124103 | 1/1983 | Fed. Rep. of Germany | 296/213 |
| 3222419 | 12/1983 | Fed. Rep. of Germany | . |
| 1346824 | 11/1963 | France | 296/222 |
| 478428 | 1/1938 | United Kingdom | 296/222 |
| 2122143 | 1/1984 | United Kingdom | . |

Primary Examiner—Dennis H. Pedder
Attorney, Agent, or Firm—Sixbey, Friedman & Leedom

[57] ABSTRACT

Vehicle roof, particularly for passenger vehicles, connected to whose roof there are side panels forming roof struts. The connection areas between the roof panel and side panels are downwardly offset and are respectively covered by a molded strip. The roof has a roof opening which extends approximately up to the connecting areas. A tiltable cover which can be moved rearwardly is provided for selectively closing and at least partially uncovering of the roof opening. The outer edge of the cover in its closed position is pressed against a cover gasket from above. The gasket at the side of the roof opening, at least supplements the respective molding strip by replacing the molding strips in the area of the roof opening, or by extending along the side of the molding strip facing the roof opening, or by forming a portion of the molding strip itself.

22 Claims, 4 Drawing Sheets

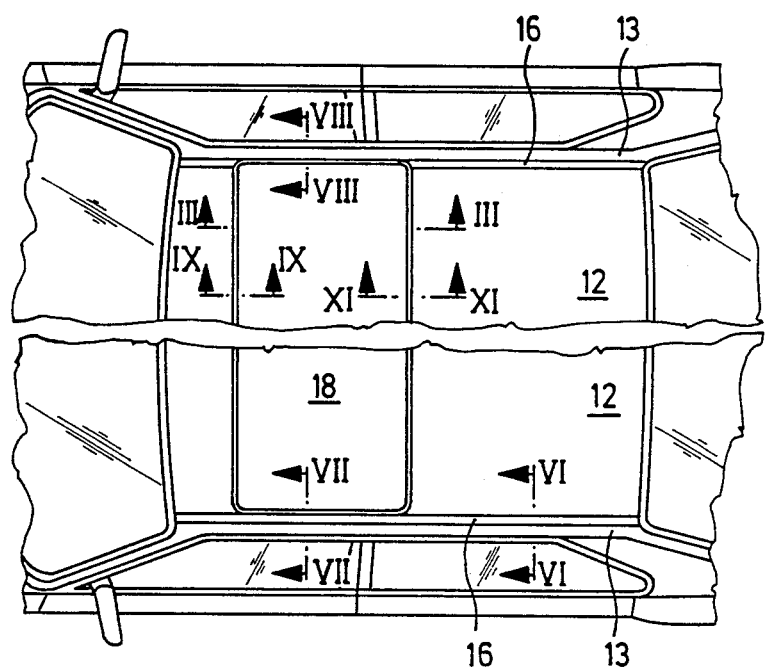

VEHICLE ROOF

BACKGROUND AND SUMMARY OF THE INVENTION

The invention relates to a vehicle roof, particularly for passenger vehicles, at whose roof panel there are connected side panels which form roof struts, whereby the connecting areas between the roof panel and the side panels are depressed and are respectively covered by a molding strip.

Vehicle roofs of this kind are known (German Offenlegungsschrift No. 29 16 682), where the roof panel extends full length from roof strut to roof strut, i.e., there is no roof opening.

In a similarly constructed known vehicle roof (German Offenlegungsschrift No. 32 22 419), however, a covering of the connecting areas between the roof panel and the side panels by molding strips is not disclosed, and the roof panel has a roof opening which can be closed by a sliding roof, the roof opening terminating at a substantial distance from the roof struts.

It is the objective of the invention, to provide a vehicle roof of the kind initially mentioned, which in a relatively uncomplicated manner can be opened over as large a surface as possible widthwise of the vehicle, has a particularly low overall height, ensures a satisfactory sealing, and at the same time has an attractive appearance.

This objective is obtained in that the roof is provided, at a minimum, with an opening reaching approximately up to the connection areas; in that there is a tiltable cover which can be moved rearwardly above the roof panel for selectively covering and, at least partially, uncovering the roof opening; and in that the cover side edges, in the closed position of the cover are pressed from above against a cover gasket which is either formed by the respective molding strip itself, or replaces the molding strips in the area of the roof opening, or extends along the side of the molding strip facing the roof opening.

When the cover of the vehicle roof in accordance with present invention, is in the closed position, it is difficult to discern that the roof is a slidable roof, because the side edges of the cover are substantially flush with the side edges of the roof panel. When the cover is moved back, an opening of maximum width is uncovered, which results in at least approximating the feeling of riding in an open (convertible) car. The use of a cover which can be rearwardly displaced above the roof panel (a so-called spoiler roof) is known as such, (e.g. German Offenlegungsschrift Nos. 33 11 442 and 34 08 056, the latter of which corresponds to U.S. patent application Ser. No. 707,762, filed Mar. 4, 1985, now U.S. Pat. No. 4,647,106) and leads to a roof configuration which requires a particularly low overall height. Moreover, a secure, and at the same time, inconspicuous sealing of the cover in the closed position is ensured.

In a further development of the invention, the cover gasket is supported directly and/or indirectly, by a reinforcing frame surrounding the roof opening, which frame extends in the area of the roof opening below the connecting area. Such support is especially important when using relatively thin roof panels, as without such reinforcement, there is the danger that the roof panels may become undesirably deformed. Thus, the reinforcement frame effectively contributes to a secure sealing of the cover when it is in the closed position. A particularly sturdy construction is obtained here if the reinforcement frame is laterally attached, directly at the roof struts.

The cover and the operating parts for guiding and moving the cover, as they are disclosed, for example, in the above mentioned German Offenlegungsschrift Nos. 33 11 442 and 34 08 056, are preferably supported by a sliding roof frame which is connected with the reinforcement frame, and is appropriately bolted therewith. In this regard the sliding roof frame, advantageously, may bear against the reinforcement frame from below.

Advantageously, the design is such that at least in the area of the front and rear edges of the roof opening, the roof panel is stepped, and the reinforcement frame forms a contact flange for the cover gasket, which protrudes into the roof opening starting from the downwardly extending leg of the stepped roof panel. In this instance, the cover gasket is supported directly from below by the reinforcement frame. The manufacturing of the roof panel with a single step is particularly cost-effective. In accordance with a variation of the invention, the roof panel has a double step, at least in the area of the front and rear edges of the roof opening, and an edge part, formed by the double step of the roof panel below the roof surface is underlied by an edge flange of the reinforcement frame. In this case, the cover gasket is seated, at least partially, with its underside on the lowered edge portion of the roof panel, which on its part is supported by the reinforcement frame in this area, in order to absorb the contact pressure of the cover when it is in the closed position.

Preferably the cover gasket is designed as a profiled strip having a relatively hard base element and a relatively soft cover contact element joined to form a single unit. Such a design compensates for the unavoidable manufacturing and mounting tolerances without jeopardizing the security of the tightness. Appropriately, the base portion has a cross-section which is approximately L-shaped, while the cover contact portion, together with the base portion, preferably forms two hollow sections, which extend parallel to each other, and which are separated by a channel. In the cover's closed position the outer edge of the cover, and an edge portion of the cover spaced inwardly therefrom, are seated onto such hollow sections. In this manner two consecutive gasket zones are formed. The channel in-between, can be utilized to capture penetrating water.

Appropriately, the design is such that the upper side of the outer hollow section is higher than the upper side of the inner hollow section, and the cover, in the edge portion cooperating with the inner hollow section, has a reinforcement bead which projects downwardly.

In order to fix the cover gasket in exact alignment with the reinforcement frame, the cover gasket, approximately is provided with a slot at its underside. This slot is engaged by an inner edge of the reinforcement frame. Advantageously, the inner edge of the reinforcement frame engaging the slot of the cover gasket is angled upwardly, which not only enhances the anchoring of the gasket, but also ensures an exact transverse alignment of the gasket.

The cover gasket may have a raised lip in the area of the front edge of the roof opening, which acts as a wind deflector when the cover is moved to the rear.

These and further objects, features and advantages of the preesnt invention will become more obvious from the following description when taken in connection with the accompanying drawings which show, for purposes of illustration only, several embodiments in accordance with the present invention.

BRIEF DESCRIPTION OF THE DRAWING

FIG. 1 is a top view of the right side of a vehicle roof in accordance with the invention;

FIG. 2 is a top view of the left side of a modified embodiment of a vehicle roof in accordance with the invention;

DETAILED DESCRIPTION OF THE PREFERRED EMBODIMENTS

Figure 3:
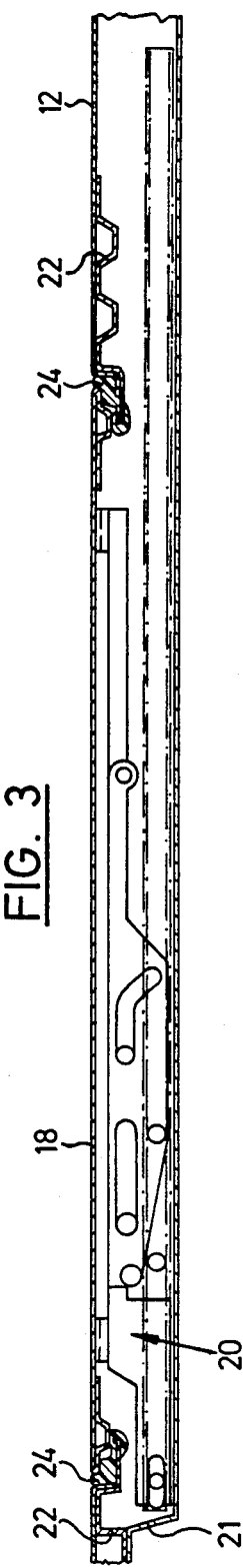
FIGS. 3-5 show, in an enlarged scale, longitudinal sections along line III-III of FIG. 1 for various cover positions.
Figure 4:
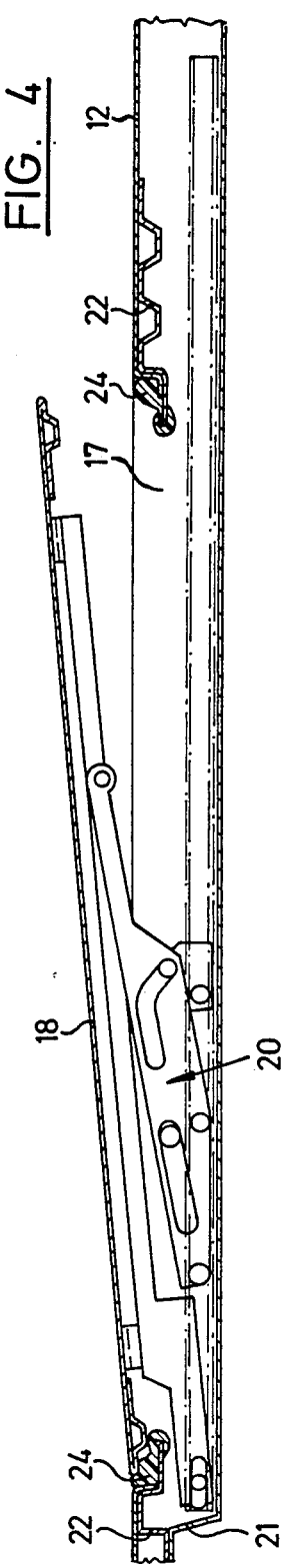
Figure 5:
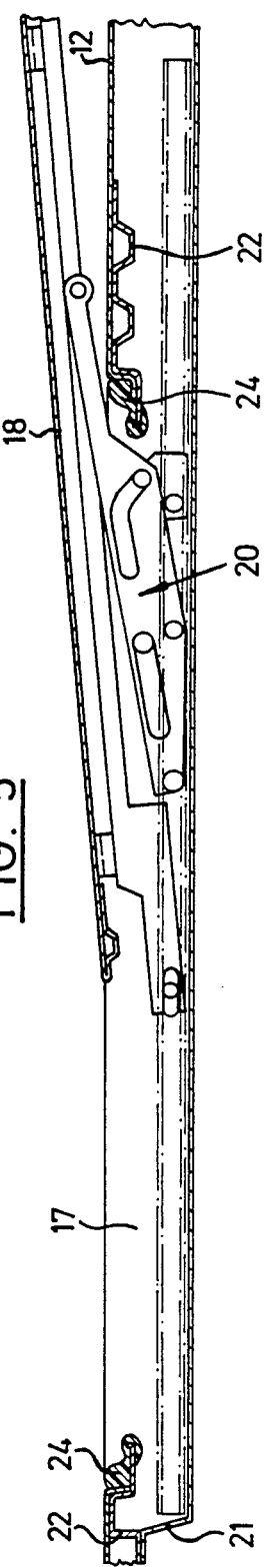
Figure 6:
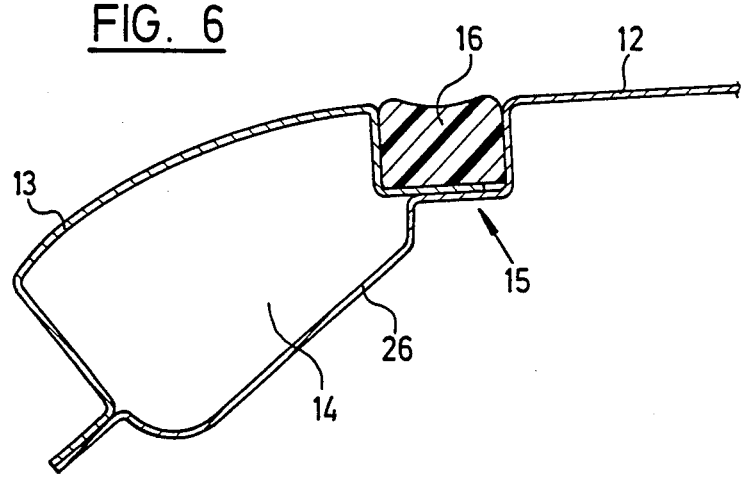
FIGS. 6-9 show, in a further enlarged scale, sections taken along lines VI—VI and VII—VII of FIG. 2 and lines VIII—VIII and IX—IX of FIG. 1, respectively.

A vehicle top as depicted in FIGS. 1 and 2 has a roof panel 12, to which side panels 13, forming roof struts 14, are connected, as specifically illustrated in FIG. 6. the connecting areas 15 between roof panel 12 and side panels 13 are downwardly offset from panels 12, 13, and are covered by molding strips 16. In the vehicle roof there is a roof opening 17 extending transversely as far as to the connecting areas 5. That is, the roof panel 12 and side panel 13 are connected in downwardly offset connecting areas 15 of connecting zones that extend the longitudinal length of the roof at opposite lateral sides of the roof, and the roof opening 17 extends substantially to those connecting zones, as well, between front and rear connecting areas as apparent from FIGS. 1 and 2. A cover 18 is provided for selectively closing, and at least partially, uncovering the opening 17. The cover 18 can be tilted from the closed position according to FIG. 3 into that shown in FIG. 4, and can be slid rearwardly over roof panel 12 (FIG. 5). For this purpose, operating elements are provided that are indicated only schematically in FIGS. 3-5, and which serve to provide guidance and movement of cover 18. These operating elements are designated, in their entirety, with reference numeral 20. Such elements may be constructed, for example, along the lines of those disclosed in U.S. Application Ser. No. 707,762, Filed Mar. 4, 1985 or German Offlegungsshrift 33 11 442 which corresponds to U.K. Pat. No. 2,122,143, and do not, themselves, form part of the present invention.

Figure 7:
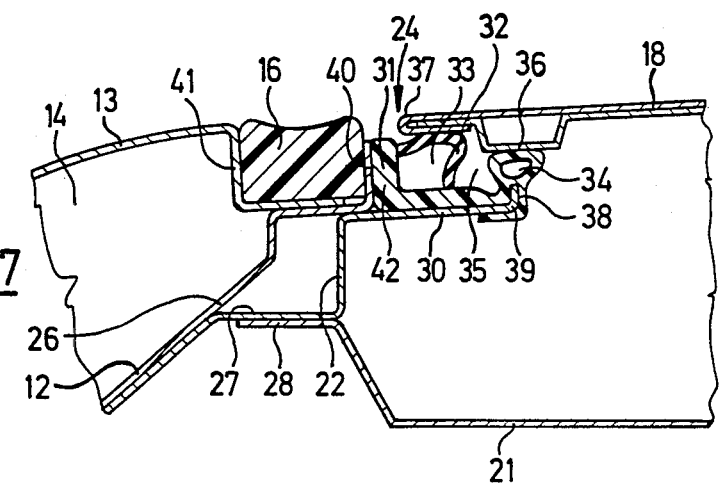
Figure 8:
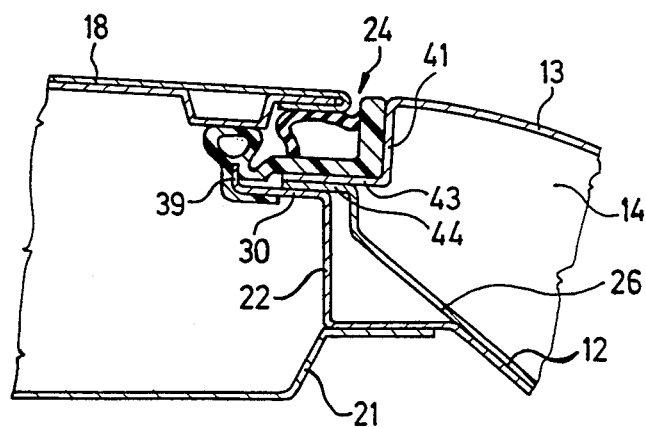
Figure 12:
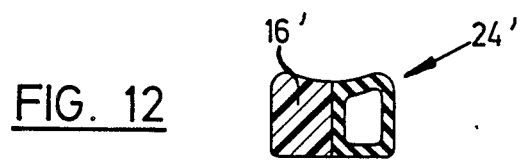
FIG. 12 is a section through a modified cover gasket.

Cover 18 and operating elements 20 are supported by a roof frame 21 that is installed from below against a reinforcement frame 22 and is connected therewith, for example, by bolts. In the closed position of cover 18, its side edges are pressed against a cover gasket 24 from above. In the embodiment of FIGS. 1 and 8, cover gasket 24 replaces the molding strip 16 in the area of roof opening 17, i.e., at this area gasket 24 also serves as the molding strip. In contrast, FIGS. 2 and 7 show a variation in which cover gasket 24 extends along the side of molding strip 16 at its side facing roof opening 17. Finally, FIG. 12 shows a still further variation, in which cover gasket 24' is formed by the molding strip 16' itself. Thus, viewed in the context of all of these embodiments, the cover gaskets of the present invention can be said to at least supplement the molding strip since, in the connecting areas at the lateral sides of the roof opening, they at least complete (FIG. 12) or are in addition to (FIG. 7) the molding strip and can actually replace (FIG. 8) at least a portion of the molding strip.

In the examples depicted if FIGS. 6, 7 and 8, roof panel 12 continues laterally as side parts 26 which extend below side panels 13. Side parts 26, jointly with roof panels 13, form roof strut 14. Alternatively, the outer and upper walls of the strut 14 can be formed by the roof panel itself, and the side panels 13 may be positioned below the roof panel. Another possibility would be to have the roof panel 12 terminate in connecting areas 15 and to construct the roof struts as an outer and an inner panel, for example.

The reinforcement frame 22 is laterally attached at the roof strut 14, i.e. in an area of the roof having particularly high rigidity.

In the example illustrated in FIG. 7, the reinforcement frame 22, in the area of the side edges of roof opening 17, is double-stepped. A first lower step forms a substantially horizontal contact surface 27, for an outer edge 28 of roof frame 21, which also extends substantially horizontally. The upper, second step creates an essentially horizontal contact flange 30 for cover gasket 24. In accordance with FIG. 7, cover gasket 24, is a profiled strip that is equipped with a relatively firm base part 31 having a L-shaped cross section, and a relatively soft cover contact part 32 that is joined to form a unit with base part 31. Cover contact part 32, together with base part 31, forms two hollow sections 33, 34 that extend parallel to each other and are separated by a channel 35. The outer hollow section 33 is higher than the inner hollow section 34. In the edge area, cover 18 has a downwardly protruding reinforcement bead 36 which makes contact against the upper side of hollow section 34. The outer edge 37 of cover 18 is seated onto hollow section 33 in the closed position of the cover. The cover gasket 24, at its underside, has a slot 38 which is engaged upon an upwardly angled inner edge 39 of reinforcing frame 22.

In a variation according to FIG. 7, roof panel 12 has a raised section 40 at the side edges of roof opening 17. The outer side of section 40 is contacted by molding strip 16, which is supported, at its opposite side surface and its bottom surface, on an offset 41 of side panel 13. Raised leg 42 of base part 31 is positioned against the inner side of section 40. As a consequence, base part 31 becomes laterally fixed between the upwardly angled inner edge 39 of reinforcement frame 22 and the raised section 40 of roof panel 12. Raised leg 42, in effect, is also a supplemental molding strip, and may extend upwardly to the height of cover 18, as in the case with the other embodiments described below.

Essentially, the embodiment according to FIG. 8 differs from that according to FIG. 7 in that the molding strip 16 only extends longitudinally from the front edge and the rear edge of roof to the front and rear edges, respectively, of the opening 17 and is replaced by cover gasket 24 along the longitudinally extending, lateral edge of the roof opening. Gasket 24 is retained between the raised inner edge 39 of reinforcement frame 22 and the stepped offset 41 of side panel 13. The reinforcement frame 22, with its supporting flange 30, underlies superimposed flanges 43, 44 of side panels 13 and roof panel 12, respectively, which flanges essentially extend horizontally. As a consequence, contact forces exercised by cover 18 onto cover gasket 24 are also effectively absorbed by reinforcement frame 22. Thus, the raised leg of gasket 24 is the only molding strip in the area of roof opening 17.

Figure 9:
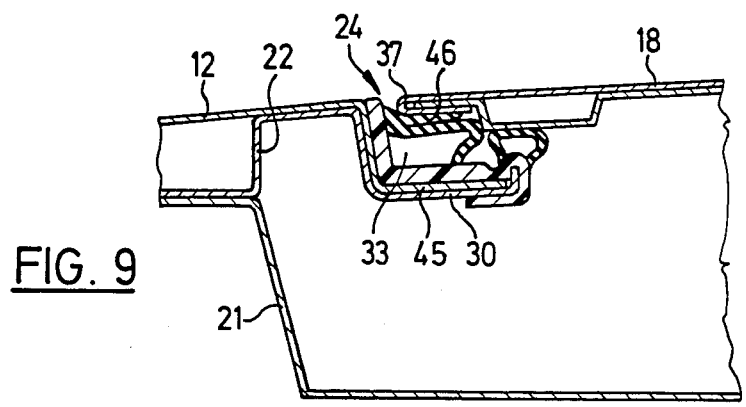

In accordance with FIG. 9, roof panel 12, in the area of the front upper edge of roof opening 17 is bent into a stepped configuration forming an edge portion 45 on roof panel 12. The edge portion 45 is positioned below the roof surface, is essentially horizontal and a supporting flange 30 of reinforcement frame 22 underlies it. Cover gasket 24 is seated onto edge portion 45. In the front area, a lip 46 is formed into the cover gasket. In the cover's closed position (FIG. 9), lip 46 is pressed substantially flat against the upper side of hollow section 33 by outer edge 37 of cover 18. When the cover is moved back (FIG. 10) lip 46 rises above the roof surface and acts as a wind deflector. It should be recognized that use of a gasket wind deflector lip is applicable with any of the lateral edge embodiments.

Figure 10:
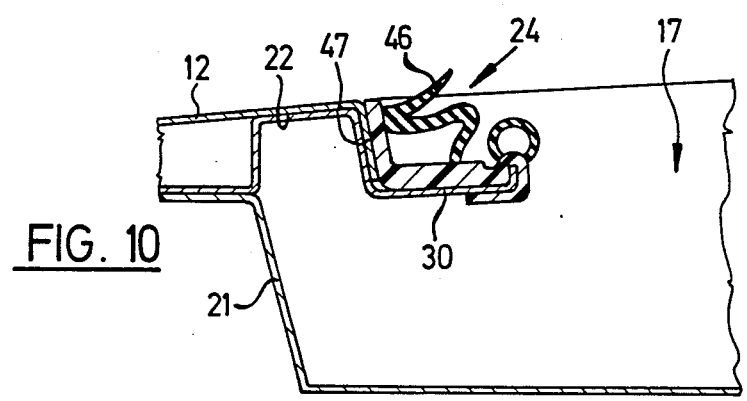
FIG. 10 is a section similar to FIG. 9, but for a modified embodiment of the invention.
Figure 11:
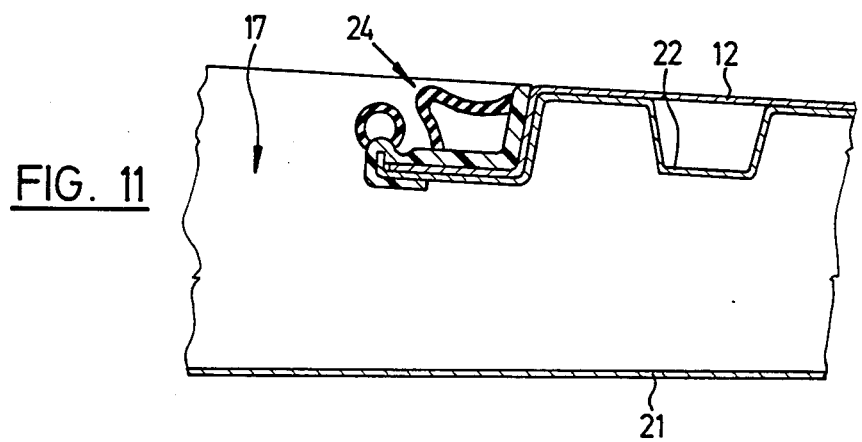
FIG. 11 is a section taken along line XI—XI of FIG. 1.

In the area of the rear edge of roof opening 17 (FIG. 11), cover gasket 24 can be supported in substantially the same manner as at the front edge of the roof opening (FIG. 9). A variation thereof is shown in FIG. 10, where the roof panel 12, at the front opening of roof opening 17, has only a single downward bend and the cover gasket 24 is seated directly on supporting flange 30 of reinforcing frame 22, whereby the supporting flange projects into the roof opening from downwardly extending leg 47 of the bent edge of roof panel 12. An appropriate design can be similarly provided in the area of the rear edge of roof opening 17.

In the case of the seal embodiment depicted according to FIG. 12, cover gasket 24' forms an inside portion of molded strip 16' itself, and together present a cross-sectional shape corresponding to molding strip 16.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

We claim:

1. In a vehicle roof, particularly for passenger vehicles, of the type having a roof panel connected to side panels that form roof struts in a manner forming connecting areas between the roof panel and the side panels in connecting zones extending the longitudinal length of the roof at opposite lateral sides of the roof, said connecting areas being downwardly offset from the roof and side panels and being covered by a respective molding strip, the improvement wherein the roof panel has a roof opening extending widthwise across the roof substantially to the connecting zones and a tiltable cover is provided which is mounted for rearward movement above the roof panel and for selectively closing and at least partially uncovering the roof opening, an outer edge of the cover, in a closed position thereof, pressing from above against a cover gasket, the respective molding strip extending along the connecting areas of the connecting zones and the cover gasket extending along the part of the connecting zones located at the sides of the roof opening.

2. Vehicle roof according to claim 1, wherein the cover gasket is supported by a reinforcing frame surrounding the roof opening and extending along the sides of the roof opening below the connecting areas.

3. Vehicle roof according to claim 2, wherein the reinforcement frame is laterally attached to the roof struts.

4. Vehicle roof according to claim 2, wherein the cover and operating elements for guiding and moving the cover are supported by a roof frame which is connected with the reinforcement frame.

5. Vehicle roof according to claim 4, wherein that the roof frame is installed against the reinforcement frame from below.

6. Vehicle roof, according to claim 2, wherein, at least in the area of a front edge of the roof opening, the roof panel has a single downward bend, and the reinforcement frame forms a supporting flange for the cover gasket, said cover gasket projecting into the roof opening from a downwardly extending leg of the bent roof panel.

7. Vehicle roof according to claim 2, wherein, at least portions of the roof panel bounding the front and rear edges of the roof opening are shaped in a stepped manner, and a contact flange of the reinforcement frame underlies an edge portion of the stepped edges that is located below the roof surface.

8. Vehicle roof according to claim 1, wherein the cover gasket is a profiled strip having a relatively hard base portion, joined with a relatively soft cover contact portion to form a single unit.

9. Vehicle roof according to claim 8, wherein the base portion has a portion with a cross-section which is approximately L-shaped.

10. Vehicle roof according to claim 9, wherein the cover contact portion, together with the base part, forms hollow sections that extend parallel to each other, separated by a channel; the outer edge of the cover and an edge portion thereof located interiorly and at a distance from the outer edge being seated on a respective one of the hollow sections when the cover is in the closed position.

11. Vehicle roof according to claim 10, wherein an upper side of an outer one of the hollow sections is higher than an upper side of an inner one of the hollow sections, and wherein said cover edge portion is a downwardly protruding reinforcement bead.

12. Vehicle roof according to claim 8, wherein the cover contact portion, together with the base part, forms hollow sections that extend parallel to each other, separated by a channel; the outer edge of the cover and an edge portion thereof located interiorly and at a distance from the outer edge being seated on a respective one of the hollow sections when the cover is in the closed position.

13. Vehicle roof according to claim 12, wherein an upper side of an outer one of the hollow sections is higher than an upper side of an inner one of the hollow sections, and wherein said cover edge portion is a downwardly protruding reinforcement bead.

14. Vehicle roof according to claim 2, wherein the cover gasket is a profiled strip having a relatively hard base portion joined with a relatively soft cover contact portion to form a single unit, and wherein the cover gasket is provided with a slot at its underside which is engaged by an inner edge of reinforcement frame.

15. Vehicle roof according to claim 14, wherein the inner edge of the reinforcement frame is upwardly angled for engaging said slot of the cover gasket.

16. Vehicle roof, according to claim 8, wherein the cover gasket in a area of the front edge of roof opening, has a raised lip, which acts as a wind deflector, when the cover is slid back.

17. Vehicle roof according to claim 1, wherein the cover gasket is also the only molding strip at the sides of the roof opening.

18. Vehicle roof according to claim 1, wherein the cover gasket is disposed laterally to the inside of the molding strip at the sides of the roof opening.

19. Vehicle roof according to claim 1, wherein the cover gasket is formed as part of the molding strip itself.

20. Vehicle roof according to claim 1, wherein the roof opening extends completely across the roof between the connecting areas.

21. Vehicle roof according to claim 1, wherein the gasket at least partially replaces the molding strip as a cover in a portion of the connecting zone extending between connecting areas disposed forwardly of and rearwardly of the roof opening.

22. Vehicle roof according to claim 1, wherein the gasket runs parallel to the molding strip in close proximity thereto in a portion of the connecting zone extending between connecting areas disposed forwardly of and rearwardly of the roof opening.

* * * * *